(12) United States Patent
    Kim (10) Patent No.: US 12,547,791 B2
(45) Date of Patent: Feb. 10, 2026

(54) SYSTEM FOR FABRICATING WATCH PROTECTION FILMS BASED ON WATCH MODEL PROFILE DATA

(71) Applicant: Hartist and Company, Inc, Seoul (KR)

(72) Inventor: Jun Yeong Kim, Seoul (KR)

(73) Assignee: Hartist and Company, Inc, Seoul (KR)

( * ) Notice: Subject to any disclaimer, the term of this patent is extended or adjusted under 35 U.S.C. 154(b) by 0 days.

(21) Appl. No.: 19/230,262

(22) Filed: Jun. 6, 2025

(65) Prior Publication Data
    US 2026/0030402 A1    Jan. 29, 2026

(30) Foreign Application Priority Data
    Jul. 26, 2024  (KR) .......................... 10-2024-0099586

(51) Int. Cl.
    *G06F 30/17*    (2020.01)
    *G06F 30/12*    (2020.01)

(52) U.S. Cl.
    CPC .............. *G06F 30/17* (2020.01); *G06F 30/12* (2020.01)

(58) Field of Classification Search
    CPC ........... G06F 30/00; G06F 30/17; G06F 30/12
    USPC ........................................................ 703/7, 6
    See application file for complete search history.

(56) References Cited

U.S. PATENT DOCUMENTS

| 2012/0192424 A1* | 8/2012 | Cataldo | ................. | B33Y 50/02 29/896.33 |
| 2019/0035162 A1* | 1/2019 | Maxwell | ................. | G06T 19/20 |

FOREIGN PATENT DOCUMENTS

| CN | 210573221 U | * | 5/2020 | | |
| CN | 215181451 U | * | 12/2021 | | |
| KR | 101418974 B1 | * | 7/2014 | ........... | G06K 7/1417 |
| KR | 1020200056887 A | | 5/2020 | | |
| KR | 102243488 B1 | * | 4/2021 | ............ | G06F 30/00 |
| KR | 102677636 B1 | | 6/2024 | | |

OTHER PUBLICATIONS

Korean Notice of Allowance for KR 10-2024-0099586 issued Mar. 31, 2025.
Korean Office Action issued for KR 10-2024-0099586 issued on Oct. 12, 2024.

* cited by examiner

*Primary Examiner* — Cedric Johnson
(74) *Attorney, Agent, or Firm* — Dinsmore & Shohl LLP; Yongsok Choi, Esq.

(57) ABSTRACT

The present disclosure relates to a watch protection film fabrication system based on watch model profile data, which includes a modular server that fabricates WatchShells based on a dimension of a watch. The watch protection film fabrication system also includes a user terminal that purchases the WatchShells fabricated on the modular server.

2 Claims, 3 Drawing Sheets

SYSTEM FOR FABRICATING WATCH PROTECTION FILMS BASED ON WATCH MODEL PROFILE DATA

CROSS-REFERENCE TO RELATED APPLICATION

This application claims priority to Korean Patent Application No. 10-2024-0099586 filed on Jul. 26, 2024, the entire contents of which are herein incorporated by reference.

BACKGROUND

1. Field

The present disclosure relates to a watch protection film fabrication system based on watch model profile data.

2. Description of Related Art

A wristwatch is composed of a watch, a watch strap for fixing the watch to the wrist, and a fixing device for fastening the watch strap.

The watch strap of such a wristwatch is generally composed of an adjustment part that has a plurality of coupling holes formed to fit a thickness of a user's wrist, and a fixing part that fastens the coupling holes with a buckle to fix the watch to the wrist.

However, high-end wristwatches have the drawback of being prone to scratches on their exterior when directly exposed to impacts.

In addition, the domestic watch film market is currently identified as a home-based handicraft industry, and this is also not being precisely fabricated according to a company pattern using a 3D machine.

Meanwhile, the above-described background technology is technical information that the present inventor possesses for deriving the present disclosure or acquires in the process of deriving the present disclosure, and cannot necessarily be said to be a publicly known technology disclosed to the general public before the application of the present disclosure.

RELATED ART DOCUMENT

[Patent Document]
Korean Patent No. 10-2677636

SUMMARY

The present disclosure provides a watch protection film fabrication system based on watch model profile data in which dimensions of each part are unitized to enable various combinations based on WatchShells commercialization drawings.

Technical objects of the present disclosure are not limited to the objects described above. That is, other objects that are not mentioned may be obviously understood by those skilled in the art from the following description.

In an aspect of the present disclosure, a watch protection film fabrication system based on watch model profile data includes a modular server that fabricates WatchShells based on a dimension of a watch.

A watch protection film fabrication system based on watch model profile data a may further include user terminal that purchases the WatchShells fabricated on the modular server.

The modular server may include: a profiler unit that obtains various watch model samples, which are attachments to which watch films are to be attached, and then measures a shape and size of each watch using a 3D scanner device to generate watch profile data; a 3D drawing production unit that fabricates a 3D film watch drawing based on the watch profile data generated by the profiler unit to generate 3D CAD data of the watch; a 2D drawing production unit that fabricates a 2D film watch drawing based on the 3D CAD data of the watch generated by the 3D drawing production unit to generate 2D CAD data of the watch; and a drawing processing unit that precisely refines the 2D CAD data of the watch generated through the 2D drawing production unit and adjusts a tolerance to complete a WatchShells commercialization drawing.

The profiler unit may acquire a watch model sample by directly measuring the dimensions of each part using a 3D scanner device by purchasing or renting various watch models, receive information on the dimensions of each part from a manufacturer that has fabricated various watch models, or receive the information on the dimensions of each part of the watch model that wishes to purchase the WatchShells from the user terminal to acquire the watch model sample.

The profiler unit may accumulate and store watch profile data, which is the shape and size of each watch model measured by the 3D scanner device, along with the model name of the corresponding watch model.

The drawing processing unit may unitize and store the dimensions of each part based on the completed WatchShells commercialization drawing so that various combinations are possible.

When a new watch model of the same manufacturer is released, the profiler unit may measure more accurate watch profile data based on the watch profile data measured by the 3D scanner device in the shape of each watch and the dimensions of each part that are unitized and stored in the drawing processing unit.

The drawing processing unit may measure more accurate watch profile data based on the corresponding watch profile data obtained by measuring a separate watch form by the 3D scanner device in the profiler unit and the dimensions of each part that are unitized and stored in the drawing processing unit to reduce a tolerance adjustment range and shorten a completion period of the WatchShells commercialization drawing.

The film may be accurately attached to an outer surface of the watch and fabricated to protect the outer surface of the watch, and attached to each component that constitutes the watch and is fabricated to protect the watch from external factors of scratches.

When acquiring the watch model sample by receiving the information on the dimensions of each part of the watch model that the user wishes to purchase the WatchShells from the user terminal, the profiler unit may provide a message suggesting re-entry of the dimensions of each part of the watch or watch delivery to the user terminal when the difference between the dimensions of each part of the watch model input from the user terminal and the dimensions of each part of the watch model from the same manufacturer and similar model lines is determined to be large using [Equation 1] below based on a difference between the information on the dimensions of a case for the watch model input from the user terminal and information on the dimensions of a case for the watch model of the same manufacturer and similar model line as the watch model input from the user terminal, a difference between information on a dimension of a lug of the watch model input from the user terminal and the information on the dimensions of the lug of the watch model of the same manufacturer and similar model line as the watch model input from the user terminal, a difference between information on a dimension of a strap of the watch model input from the user terminal and the information on the dimensions of the strap of the watch model of the same manufacturer and similar model line as the watch model input from the user terminal, and a difference between information on a dimension of a buckle of the watch model input from the user terminal and the information on the dimensions of the buckle of the watch model of the same manufacturer and similar model line as the watch model input from the user terminal.

$$P_f=\log\{C_d+\sqrt{L_d}(S_d)^2+(B_d)^2\}$$ [Equation]

(Cd means the difference between the dimension information of the case of the watch model input from the user terminal and the dimension information of the case of the watch model of the same manufacturer and similar model line as the watch model input from the user terminal, Ld means the difference between the dimension information of the lug of the watch model input from the user terminal and the dimension information of the lug of the watch model of the same manufacturer and similar model line as the watch model input from the user terminal, Sd means the difference between the dimension information of the strap of the watch model input from the user terminal and the dimension information of the strap of the watch model of the same manufacturer and similar model line as the watch model input from the user terminal, Bd means the difference between the dimension information of the buckle of the watch model input from the user terminal and the dimension information of the buckle of the watch model of the same manufacturer and similar model line as the watch model input from the user terminal, and $P_f$ means a numerical value that serves as a basis for providing a message suggesting the re-entry of the dimensions of each part of the watch or the watch delivery to the user terminal.)

DETAILED DESCRIPTION

Embodiments of the present disclosure will be described in detail with reference to the accompanying drawings. These embodiments will be described in detail for those skilled in the art to practice the present disclosure. It should be appreciated that various embodiments of the present disclosure are different from each other, but do not have to be exclusive. For example, specific shapes, structures, and characteristics described herein may be implemented in another embodiment without departing from the spirit and the scope of the present disclosure in connection with an embodiment.

It is to be understood that when one component is referred to as being "connected to" or "fastened to" another component, one component may be connected directly to or coupled directly to another component or be connected to or fastened to another component with the other component interposed therebetween. On the other hand, it is to be understood that when one component is referred to as being "connected directly to" or "fastened directly to" another component, it may be connected to or coupled to another component without the other component interposed therebetween.

In addition, it should be understood that positions or an arrangement of individual components in each disclosed embodiment may be changed without departing from the spirit and the scope of the present disclosure. Therefore, a detailed description described below should not be construed as being restrictive. In addition, the scope of the present disclosure is defined only by the accompanying claims and their equivalents if appropriate. Similar reference numerals will denote the same or similar functions throughout the accompanying drawings.

Hereinafter, exemplary embodiments of the present disclosure will be described in more detail with reference to the drawings.

Figure 1:
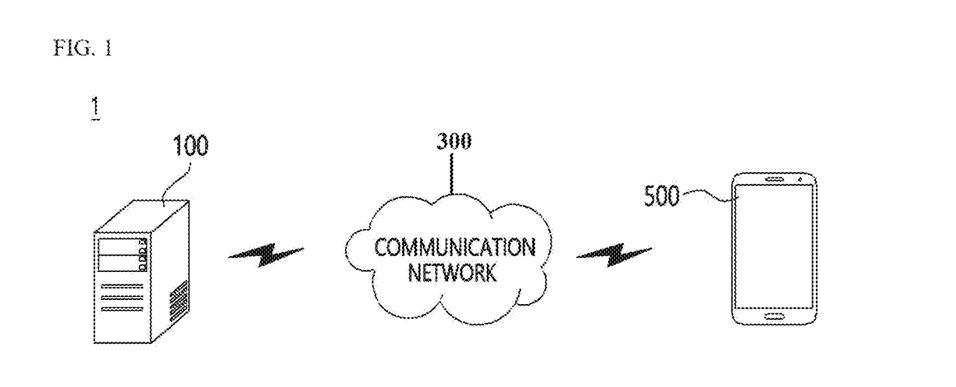
FIG. 1 is a conceptual diagram of a watch protection film fabrication system based on watch model profile data according to an embodiment of the present disclosure.

FIG. 1 is a conceptual diagram of a watch protection film fabrication system based on watch model profile data according to an embodiment of the present disclosure.

FIG. 1 is a conceptual diagram of a system according to an embodiment of the present disclosure.

Referring to FIG. 1, a watch protection film fabrication system based on watch model profile data according to an embodiment of the present disclosure may include a modular server 100 and a user terminal 500.

The watch protection film fabrication system based on watch model profile data proposed in the present disclosure may mean that it is fabricated based on WATCHSHELLS modular factory architecture.

Here, WATCHSHELLS may mean a film that protects a display, a case, a lug, a strap, and a buckle of a watch.

In addition, the modular server 100 proposed in the present disclosure modularizes various watch models and stores the modularized watch models as profiles, and generated based on the stored processes tolerances information to fabricate a watch protection film which is the WATCHSHELLS.

The modular server 100 may fabricate the WatchShells based on dimensions of a watch according to the present disclosure.

The user terminal 500 may purchase the WatchShells fabricated by the modular server 100.

The modular server 100 and the user terminal 500 may be their own server for providing services according to the present disclosure, a cloud server, or a peer-to-peer (p2p) collection of distributed nodes.

The modular server 100 may perform at least one of operation, storage, reference, input/output, and control functions of a general computer, and may include an artificial neural network to be described later based on input data.

The modular server 100 may include a processor and a memory. The processor may produce the WatchShells based on the dimensions of the watch according to the present disclosure, and may include devices capable of performing the same. The processor may execute a program or control the modular server 100. A program code executed by the processor may be stored in the memory. The memory may store related information for performing the services according to the present disclosure or a program for implementing a method. The memory may be a volatile memory or a nonvolatile memory.

The modular server 100 may transmit data to an external device or receive data from the external device using a network.

The modular server 100 may train an artificial neural network and may also use an artificial neural network that has completed training. The processor may train or execute the artificial neural network stored in the memory, and the memory may store the artificial neural network that has completed the training. An electronic device that trains the artificial neural network and the electronic device that has been used may be the same, but they may be separate.

The artificial intelligence is a computer system that implements some of the functions of the human brain and may train, guess, and judge on its own. The more training progresses, the higher the probability of extracting an answer. The artificial intelligence may be composed of training and element technologies that utilize it. The training of the artificial intelligence is an algorithm technology that classifies and trains features based on input data, and element technologies may be technologies that implement some of the functions of the human brain using a learning algorithm.

The artificial intelligence is a technology that is easy to approach a problem where multiple answers may be probabilistically generated, and may logically and probabilistically infer an optimal cycle, method, plan, etc., according to any input data. The inference technology of the artificial intelligence may include judging input data and optimizing prediction, knowledge and probability-based inference, preference-based planning, etc.

An artificial neural network is one of the learning algorithms in the field of machine learning, which implements a connection between neurons and synapses of a brain as a program. The artificial neural network may create a neural network structure as a program and then train the neural network structure to have a desired function. Although there may be errors, the artificial neural network may perform training based on huge data and output appropriate output data using the input data. It has the advantage of being able to acquire output data that has statistically good results and being similar to human reasoning.

The modular server 100 is an artificial intelligence algorithm built based on big data, which may analyze consumers' online behavior data, social media activities, search history, etc., to infer personal characteristics and interests, and may include a number of pre-trained artificial neural networks for this purpose.

The network is a high-speed backbone network of a large-scale communication network capable of large-capacity, long-distance voice and data services, and may be the Internet or a next-generation wired and wireless network for providing high-speed multimedia services.

When the network is a mobile communication network, it may be a synchronous mobile communication network or an asynchronous mobile communication network. As an example of the asynchronous mobile communication network, a communication network using a wideband code division multiple access (WCDMA) method may be cited. In this case, although not illustrated in the drawing, the network may include a radio network controller (RNC). Meanwhile, although a WCDMA network is cited as an example, it may be a 3G LTE network, a 4G network, a next-generation communication network such as another 5G network, or another IP network based on IP.

The modular server 100 and the user terminal 500 may include any terminal that may transmit and receive data through a network, such as a desktop computer, a laptop, a tablet, or a smartphone.

The modular server 100 and the user terminal 500 may include at least one of the operation, storage, reference, input/output, and control functions of the computer in order to perform the services according to the present disclosure.

The modular server 100 and the user terminal 500 may access a website or install an application in order to receive the services according to the present disclosure. The modular server 100 and the user terminal 500 may transmit and receive data through a website or an application.

The network is the high-speed backbone network of the large-scale communication network capable of the large-capacity, long-distance voice and data services, and may be the Internet or the next-generation wired and wireless network for providing the high-speed multimedia services.

When the network is the mobile communication network, it may be the synchronous mobile communication network or the asynchronous mobile communication network. As an example of the asynchronous mobile communication network, the communication network using the wideband code division multiple access (WCDMA) method may be cited. In this case, although not illustrated in the drawing, a network 300 may include the radio network controller (RNC). Meanwhile, although the WCDMA network is cited as an example, it may be the 3G LTE network, the 4G network, the next-generation communication network such as another 5G network, or another IP network based on the IP.

The WatchShells modular factory architecture 1 according to an embodiment of the present disclosure accumulates and stores watch profile data, which is the shape and size of each watch model measured by a 3D scanner device, along with the model name of the corresponding watch model, and unitizes and stores the dimensions of each part so that various combinations are possible based on the WatchShells commercialization drawing.

Figure 2:
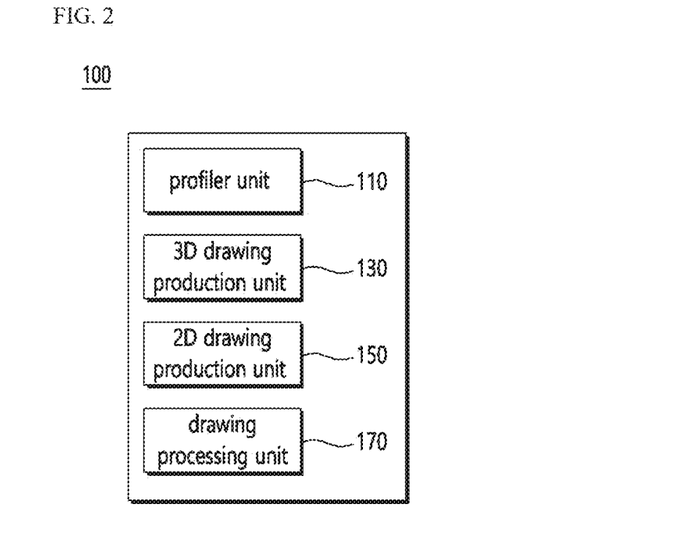
FIGS. 2 and 3 are conceptual diagrams of a modular server according to an embodiment of the present disclosure.
Figure 3:
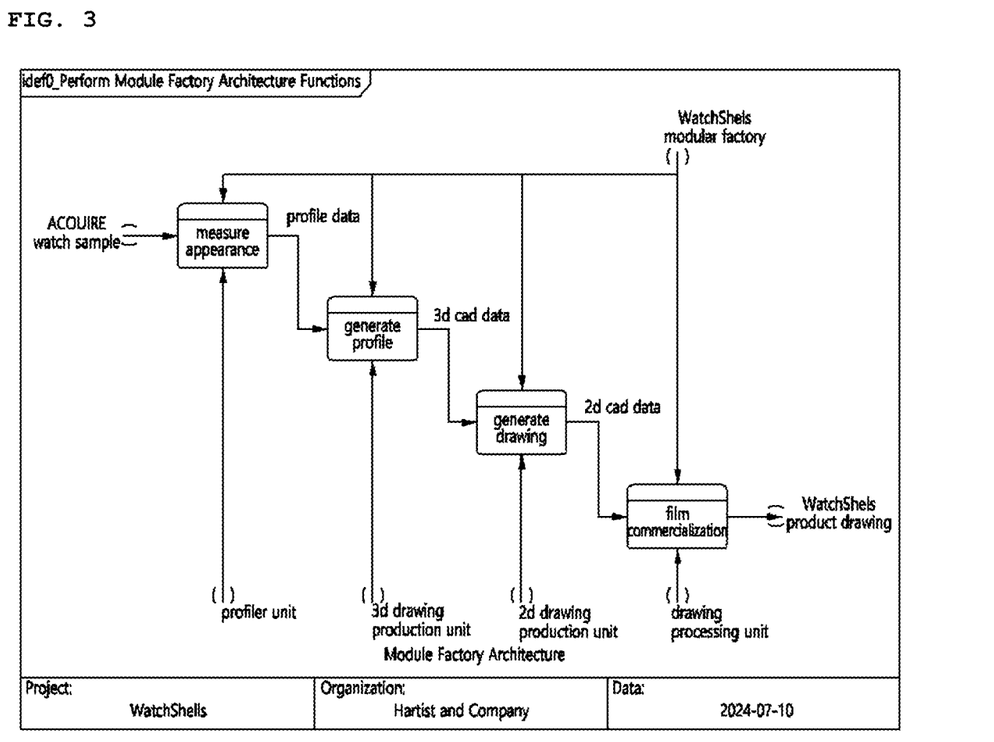

FIGS. 2 and 3 are conceptual diagrams of a modular server according to an embodiment of the present disclosure.

Referring to FIGS. 2 and 3, a modular server 100 according to an embodiment of the present disclosure may include a profiler unit 110, a 3D drawing production unit 130, a 2D drawing production unit 150, and a drawing processing unit 170.

The profiler unit 110 may obtain various watch model samples, which are attachments to which watch films are to be attached, and then measure the shape and size of each watch using a 3D scanner device to generate the watch profile data.

In addition, the profiler unit 110 may acquire watch model samples by purchasing or renting various watch models and directly measuring the dimensions of each part using the 3D scanner device, or may receive information on dimensions of each part from a manufacturer that has fabricated various watch models, or may receive the information on the dimensions of each part of the watch model that wishes to purchase the WatchShells from the user terminal 500 to obtain the watch model samples.

In addition, the profiler unit 110 may accumulate and store the watch profile data, which is the shape and size of each watch model measured by the 3D scanner device, along with the model name of the corresponding watch model.

Meanwhile, when acquiring the watch model sample by receiving the information on the dimensions of each part of the watch model that the user wishes to purchase the WatchShells from the user terminal, the profiler unit 110 may provide a message suggesting re-entry of the dimensions of each part of the watch or watch delivery to the user terminal when the difference between the dimensions of each part of the watch model input from the user terminal and the dimensions of each part of the watch model from the same manufacturer and similar model lines is determined to be large using [Equation 1] below based on a difference between the information on the dimensions of the watch model input of a case from the user terminal and information on a dimension of a case for the watch model of the same manufacturer and similar model line as the watch model input from the user terminal, a difference between information on a dimension of a lug of the watch model input from the user terminal and the information on the dimensions of the lug of the watch model of the same manufacturer and similar model line as the watch model input from the user terminal, a difference between information on a dimension of a strap of the watch model input from the user terminal and the information on the dimensions of the strap of the watch model of the same manufacturer and similar model line as the watch model input from the user terminal, and a difference between information on a dimension of a buckle of the watch model input from the user terminal and the information on the dimensions of the buckle of the watch model of the same manufacturer and similar model line as the watch model input from the user terminal.

$$P_f = \log\{C_d + \sqrt{L_d} + (S_d)^2 + (B_d)^2\} \quad \text{[Equation 1]}$$

Here, $C_d$ may mean the difference between the information on the dimensions of the case of the watch model input from the user terminal and the information on the dimensions of the case of the watch model of the same manufacturer and similar model line as the watch model input from the user terminal, La may mean the difference between the information on the dimensions of the lug of the watch model input from the user terminal and the information on the dimensions of the lug of the watch model of the same manufacturer and similar model line as the watch model input from the user terminal, $S_d$ may mean the difference between the information on the dimensions of the strap of the watch model input from the user terminal and the information on the dimensions of the strap of the watch model of the same manufacturer and similar model line as the watch model input from the user terminal, $B_d$ may mean the difference between the information on the dimensions of the buckle of the watch model input from the user terminal and the information on the dimensions of the buckle of the watch model of the same manufacturer and similar model line as the watch model input from the user terminal, and $P_f$ may mean a numerical value that serves as a basis for providing a message suggesting the re-entry of the dimensions of each part of the watch or the watch delivery to the user terminal.

However, when $$C_d + \sqrt{L_d} + (S_d)^2 + (B_d)^2$$

is '0' or '1', the Equation is not calculated and it is determined that there is no difference in the dimensions of each part of the watch, so the message suggesting the re-entry of the dimensions of each part of the watch or the watch delivery may not be provided to the user terminal.

According to the above [Equation 1], the larger the difference in the dimensions of the buckle and strap, the more noticeable the problem is to the user's eyes, so it may be applied as a square root, and in the case of the lug, it may be applied as a root because it is a part that is not noticeable to the user's eyes.

In addition, the units of each Ca, La, Sa, and $B_d$ may be used as mm, but this is omitted to facilitate the calculation of the above Equation.

For example, when $C_d$ is 1.5, La is 2, $S_d$ is 1.5, and $B_d$ is 2, $P_f$ may be calculated as 0.96, and when $C_d$ is 3, La is 3, $S_d$ is 3, and $B_d$ is 3, $P_f$ may be calculated as 1.35.

The larger the calculated value of the $P_f$ is calculated, the larger the difference in the dimensions of each part of the watch model input from the user terminal compared to the watch model of the same manufacturer and similar model line is determined, so the probability of providing the message suggesting the re-entry of the dimensions of each part of the watch or the watch delivery to the user terminal may be higher.

The smaller the calculated value of the $P_f$ is calculated, the smaller the difference in the dimensions of each part of the watch model input from the user terminal compared to the watch model of the same manufacturer and similar model line is determined, so the probability of not providing the message suggesting the re-entry of the dimensions of each part of the watch or the watch delivery to the user terminal may be higher.

Among the two examples described above, as the first example is calculated in a smaller value than the second example, the probability of not providing the message suggesting the re-entry of the dimensions of each part of the watch or the watch delivery to the user terminal may be higher for the first example compared to the second example.

Meanwhile, a clear standard for the value of $P_f$ for providing the message suggesting the re-entry of the dimensions of each part of the watch or the watch delivery to the user terminal may be preset by an administrator of the modular server 100.

For example, when the standard for the value of Pf for providing the message suggesting the re-entry of the dimensions of each part of the watch or the watch delivery to the user terminal is set to '1', the profiler unit 110 may provide the message suggesting the re-entry of the dimensions of each part of the watch or the watch delivery to the user terminal when $P_f$ is calculated to be a value greater than '1'.

According to the example where the standard of the value of $P_f$ is set to '1' for providing the message suggesting the re-entry of the dimensions for each part of the watch or the watch delivery to the user terminal, in the first example among the two examples described above, the message suggesting the re-entry of the dimensions for each part of the watch or the watch delivery may not be provided to the user terminal.

On the other hand, according to the example where the standard of the value of $P_f$ is set to '1' for providing the message suggesting the re-entry of the dimensions for each part of the watch or the watch delivery to the user terminal, in the second example among the two examples described above, the message suggesting the re-entry of the dimensions for each part of the watch or the watch delivery may be provided to the user terminal.

However, setting the standard for the value of $P_f$ to '1' for providing the message suggesting the re-entry of the dimensions for each part of the watch or the watch delivery to the user terminal is only an example, and the standard may be changed by the administrator of the modular server 100.

The 3D drawing production unit 130 may produce a 3D film watch drawing based on the watch profile data generated by the profiler unit 110 to generate 3D CAD data of a watch.

The 2D drawing production unit 150 may produce a 2D film watch drawing based on the 3D CAD data of the watch generated by the 3D drawing production unit 130 to generate 2D CAD data of a watch.

The drawing processing unit 170 may precisely refine the 2D CAD data of the watch generated by the 2D drawing production unit 150 and adjust the tolerance to complete the WatchShells commercialization drawing.

Meanwhile, the drawing processing unit 170 may calculate the result value for the entire tolerance processing range using [Equation 2] below based on a processing range according to the tolerance of the case part of the watch, a processing range according to the tolerance of the lug part of the watch, a processing range according to the tolerance of the strap part of the watch, and a processing range according to the tolerance of the buckle part of the watch, and provide feedback to the 2D drawing production unit 150, the 3D drawing production unit 130, or the profiler unit 110 to reduce the tolerance processing range when the calculated result value exceeds a predetermined value.

$$D_p = \ln(C_{at})^2 + \log(L_{at})^2 + \ln(S_{at})^2 + \ln(B_{at})^2 \quad \text{[Equation 2]}$$

Here, $C_{at}$ is the processing range according to the tolerance of the case part of the watch, $L_{at}$ is the processing range according to the tolerance of the lug part of the watch, Sat is the processing range according to the tolerance of the strap part of the watch, $B_{at}$ is the processing range according to the tolerance of the buckle part of the watch, and $D_p$ may calculate a result value for the entire tolerance processing range, and may mean a value that serves as a standard for determining whether to provide feedback to the 2D drawing production unit 150, the 3D drawing production unit 130, or the profiler unit 110 to reduce the tolerance processing range when the calculated result value exceeds a predetermined value.

For example, when $C_{at}$ is 2, $L_{at}$ is 1.5, Sat is 2, and $B_{at}$ is 1.5, $D_p$ may be calculated as 3.92, and when $C_{at}$ is 5, $L_{at}$ is 2, Sat is 4, and $B_{at}$ is 3, $D_p$ may be calculated as 8.77.

However, when $C_{at}$, $L_{at}$, $S_{at}$, and $B_{at}$ are '0' or '1', they are not substituted into the above Equation and it is determined that there is no difference in the tolerance processing range, so the feedback may not be provided to the 2D drawing production unit 150, the 3D drawing production unit 130, or the profiler unit 110.

According to the above [Equation 2], the greater the difference in the dimensions of the buckle and strap, the more noticeable the problem is to the user's eyes, but in the case of the lug, different functions may be applied to parts that are not noticeable to the user's eyes.

In addition, the units of each $C_{at}$, $L_{at}$, $S_{at}$, and $B_{at}$ may be used as mm, but this is omitted to facilitate the calculation of the above Equation.

The larger the value of the calculated $D_p$, the higher the probability that the drawing processing unit 170 will provide feedback to the 2D drawing production unit 150, the 3D drawing production unit 130, or the profiler unit 110 to reduce the tolerance processing range.

On the other hand, the smaller the value of the calculated $D_p$, the higher the probability that the drawing processing unit 170 will not provide feedback to the 2D drawing production unit 150, the 3D drawing production unit 130, or the profiler unit 110 to reduce the tolerance processing range.

Among the two examples described above, since the first example is calculated with a smaller value than the second example, the probability that the second example will not provide feedback to the 2D drawing production unit 150, the 3D drawing production unit 130, or the profiler unit 110 to reduce the tolerance processing range may be higher.

Meanwhile, a clear standard for the value of $D_p$ for providing the feedback to the 2D drawing production unit 150, the 3D drawing production unit 130, or the profiler unit 110 to reduce the tolerance processing range may be preset by the administrator of the modular server 100.

For example, when the standard for the value of Dp for providing the feedback to the 2D drawing production unit 150, the 3D drawing production unit 130, or the profiler unit 110 to reduce the tolerance processing range is set to '5', if $D_p$ is calculated to be a value greater than '5', the drawing processing unit 170 may provide the feedback to the 2D drawing production unit 150, the 3D drawing production unit 130, or the profiler unit 110 to reduce the tolerance processing range.

In the first example among the two examples described above, in which the standard for the value of $D_p$ is set to '5' for the drawing processing unit 170 to provide the feedback to the 2D drawing production unit 150, the 3D drawing production unit 130, or the profiler unit 110 in order to reduce the tolerance processing range, the drawing processing unit 170 may not provide the feedback to the 2D drawing production unit 150, the 3D drawing production unit 130, or the profiler unit 110 in order to reduce the tolerance processing range.

On the other hand, in the second example of the above-described two examples, in which the standard for the value of $D_p$ for providing the feedback to the 2D drawing production unit 150, the 3D drawing production unit 130, or the profiler unit 110 in order to reduce the tolerance processing range is set to '5', the feedback may be provided to the 2D drawing production unit 150, the 3D drawing production unit 130, or the profiler unit 110 in order to reduce the tolerance processing range.

However, setting the standard for the value of $D_p$ for providing the feedback to the 2D drawing production unit 150, the 3D drawing production unit 130, or the profiler unit 110 in order to reduce the tolerance processing range is only an example, and the standard may be changed by the administrator of the modular server 100.

In addition, the drawing processing unit 170 may unitize and store the dimensions of each part so that various combinations are possible based on the completed WatchShells commercialization drawing.

Accordingly, when a new watch model of the same manufacturer is released, the profiler unit 110 may measure more accurate watch profile data based on the watch profile data measured by the 3D scanner device in the shape of each watch and the dimensions of each part that are unitized and stored in the drawing processing unit.

Accordingly, the drawing processing unit 170 may measure more accurate watch profile data based on the watch profile data obtained by measuring a separate watch form by the 3D scanner device in the profiler unit 110 and the dimensions of each part that are unitized and stored in the drawing processing unit 170, thereby reducing the tolerance adjustment range and shortening the completion period of the WatchShells commercialization drawing.

Meanwhile, the film fabricated through the WATCHSHELLS modular factory architecture 1 is accurately attached to the outer surface of the watch and fabricated to protect the outer surface of the watch, and may be fabricated to be attached to each component of the watch to protect the watch from the outside such as scratches.

Meanwhile, the modular server 100 may calculate the overall user satisfaction using [Equation 3] below based on the fabrication period of the watch film, the accuracy of the watch film size, the satisfaction received from the user terminal 500 with respect to the attachment of the watch film, and the satisfaction received from the user terminal 500 with respect to the price of the watch film, and the server manager may determine the level of the satisfaction based on the calculated value and perform an inspection on each component or the entire component of the modular server 100.

$$S = \log \frac{S_a \times A_d \times S_p}{\sqrt{P_p}}$$

Here, $P_p$ may mean the production period of the watch film, $S_d$ may mean the accuracy of the watch film size, $A_d$ may mean the satisfaction received from the user terminal 500 regarding the watch film attachment, $S_p$ may mean the satisfaction received from the user terminal 500 with respect to the price of the watch film, and S may mean the overall satisfaction of the user.

However, $P_p$ may be substituted with a positive integer other than 0, and when $$\frac{S_a \times A_d \times S_p}{\sqrt{P_p}}$$

is '0' or '1', the user satisfaction is determined to be the lowest, and thus, the entire configuration of the modular server 100 may be inspected by the administrator without calculating the above Equation 3.

In addition, $S_a$ may be substituted by the administrator determining a value according to the processing degree according to the tolerance range of the drawing processing unit 170. When the tolerance range is small, it may be substituted with a number close to '1', and when the tolerance range is large, it may be substituted with a number close to '10'.

For example, when $P_p$ is 1, $S_d$ is 8, $A_d$ is 9, and $S_p$ is 7, S may be calculated as 2.7, and when $P_p$ is 7, $S_d$ is 3, $A_d$ is 3, and $S_p$ is 3, S may be calculated as 1.0.

The larger the calculated value of S, the more likely the server manager is to determine that the user satisfaction is high, so the probability of performing an inspection on each configuration or the entire configuration of the modular server 100 may decrease.

On the other hand, the smaller the calculated value of S, the more likely the server manager is to determine that the user satisfaction low, so the probability of performing the inspection on each configuration or the entire configuration of the modular server 100 may increase.

Among the two examples described above, since the first example is calculated as a larger value than the second example, the server manager is more likely to determine that the user satisfaction is high, so the probability of performing the inspection on each configuration or the entire configuration of the modular server 100 may decrease compared to the case of the second example.

Meanwhile, the server manager may preset a clear standard for the value of S for inspecting each component or the entire configuration of the modular server 100 in order to increase the user satisfaction.

For example, when the server manager sets the standard for the value of S for inspecting each component or the entire configuration of the modular server 100 to '1' in order to increase the user satisfaction, if S is calculated to be a value greater than '1', the server manager may not perform the inspection for each component or the entire configuration of the modular server 100 in order to increase the user satisfaction.

In the first example of the above-described two examples, in which the standard for the value of S for inspecting each component or the entire configuration of the modular server 100 is set to '1' in order to increase the user satisfaction, the server manager may determine that the user satisfaction is high and may not perform the inspection on each component or the entire configuration of the modular server 100.

On the other hand, in the second example of the above-described two examples, in which the standard for the value of S for inspecting each component or the entire configuration of the modular server 100 is set to '1' in order to increase the user satisfaction, the server manager may determine that the user satisfaction is low and may perform the inspection on each component or the entire configuration of the modular server 100.

However, setting the standard for the value of S for inspecting each component or the entire configuration of the modular server 100 to '1' in order to increase the user satisfaction is only an example, and the standard may be changed by the manager of the modular server 100.

The above-described embodiments are for illustrative purposes, and those skilled in the art will understand that the above-described embodiments can be easily modified into other specific forms without changing the technical idea or essential features of the above-described embodiments. Therefore, the above-described embodiments should be understood as illustrative in all respects and not restrictive. For example, respective components described as a single form may be implemented in a distributed manner, and similarly, components described as being distributed may also be implemented in a combined form.

Figure 4:
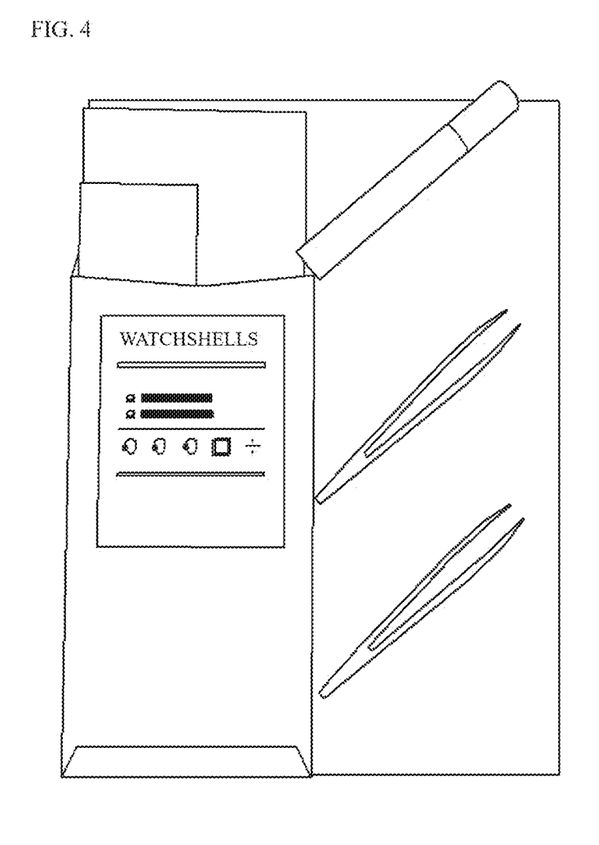
FIG. 4 is a diagram of a film attachment kit provided to a user together with a film fabricated by the watch protection film fabrication system based on watch model profile data according to an embodiment of the present disclosure.

FIG. 4 is a diagram of a film attachment kit provided to a user together with the film fabricated by the watch protection film fabrication system based on watch model profile data according to an embodiment of the present disclosure.

Referring to FIG. 4, the film attachment kit provided to the user together with the film fabricated by the watch protection film fabrication system based on watch model profile data according to an embodiment of the present disclosure includes a film, tweezers for attaching the film, and a spray containing a solution that facilitates the film attachment.

According to the watch protection film fabrication system based on watch model profile data proposed by the present disclosure according to an aspect of the present disclosure described above, by converting the sample model of the watch into the 2D drawing using the 3D scanner and then adjusting the precise dimensions to fabricate a protection film that may be accurately attached to the outer surface of the watch part, it is possible to protect the outer surface of the product without damaging the wearing sensation and aesthetics of the watch.

In addition, by accumulating and storing the watch profile data, which is the shape and size of each watch model measured by a 3D scanner device, together with the model name of the corresponding watch model, and unitizing and storing the dimensions of each part based on the Watch-Shells product drawings to allow for various combinations, it is possible to shorten the fabrication period of the Watch-Shells commercialization drawing of a new watch model.

Effects of the present disclosure are not limited to the above-mentioned effects, and various effects may be included within the range apparent to those skilled in the art from a description to be described later.

The scope of protection sought through this specification is indicated by the claims described below rather than the detailed description above, and should be interpreted to include all changes or modified forms derived from the meaning and scope of the claims and their equivalent concepts.

What is claimed is:

1. A watch protection film fabrication system based on watch model profile data, comprising:
    a modular server that fabricates a watch protective film based on a dimension of a watch; and
    a user terminal that purchases the watch protective film fabricated on the modular server,
    wherein the modular server includes:
    a processor configured to:
    obtain various watch model samples, which are attachments to which watch films are to be attached, and then measure a shape and size of each watch using a 3D scanner device to generate watch profile data;
    fabricate a 3D film watch drawing based on the watch profile data generated by the profiler unit to generate 3D CAD data of the watch;
    fabricate a 2D film watch drawing based on the 3D CAD data of the watch generated by the 3D drawing production unit to generate 2D CAD data of the watch; and
    refine the 2D CAD data of the watch generated through the 2D drawing production unit and adjust a tolerance to complete a watch protective film commercialization drawing,
    the processor is configured to acquire a watch model sample by directly measuring the dimensions of each part using a 3D scanner device by purchasing or renting various watch models,
    receive information on the dimensions of each part from a manufacturer that has fabricated various watch models, or
    receive the information on the dimensions of each part of the watch model for purchase the watch protective film from the user terminal to acquire the watch model sample,
    the processor is configured to accumulate and store watch profile data, which is the shape and size of each watch model measured by the 3D scanner device, along with a model name of a corresponding watch model,
    the processor is configured to utilize and store the dimensions of each part based on the completed watch protective film commercialization drawing to enable various combinations,
    when a new watch model of the same manufacturer is released, the processor is configured to measure more accurate watch profile data based on the watch profile data measured by the 3D scanner device in the shape of each watch and the dimensions of each part that are unitized and stored in the drawing processing unit,
    the processor is configured to measure the more accurate the watch profile data based on a corresponding watch profile data obtained by measuring a separate watch form by the 3D scanner device in the profiler unit and the dimensions of each part that are unitized and stored in the drawing processing unit to reduce a tolerance adjustment range and shorten a completion period of the watch protective film commercialization drawing, and
    the film is attached to an outer surface of the watch and is fabricated to protect the outer surface of the watch, and is attached to each component that constitutes the watch and is fabricated to protect the watch from external factors of scratches.

2. The watch protection film fabrication system of claim 1, wherein, when acquiring the watch model sample by receiving the information on the dimensions of each part of the watch model for a user to purchase the watch protective film from the user terminal, the processor is configured to provide a message suggesting re-entry of the dimensions of each part of the watch or watch delivery to the user terminal when a difference between the dimensions of each part of the watch model input from the user terminal and the dimensions of each part of the watch model from the same manufacturer and model lines is determined to be large using [Equation] below based on the difference between the information on the dimensions of a case for the watch model input from the user terminal and information on the dimensions of a case for the watch model of the same manufacturer and model line as the watch model input from the user terminal, a difference between information on a dimension of a lug of the watch model input from the user terminal and the information on the dimensions of the lug of the watch model of the same manufacturer and model line as the watch model input from the user terminal, a difference between information on a dimension of a strap of the watch model input from the user terminal and the information on the dimensions of the strap of the watch model of the same manufacturer and model line as the watch model input from the user terminal, and a difference between information on a dimension of a buckle of the watch model input from the user terminal and the information on the dimensions of the buckle of the watch model of the same manufacturer and model line as the watch model input from the user terminal, $$P_f = \log\{C_d + \sqrt{L_d(S_d)^2 + (B_d)^2}\} \quad \text{[Equation]}$$

Cd denotes a difference between the dimension information of the case of the watch model input from the user terminal and the dimension information of the case of the watch model of the same manufacturer and model line as the watch model input from the user terminal, Ld denotes a difference between the dimension information of the lug of the watch model input from the user terminal and the dimension information of the lug of the watch model of the same manufacturer and model line as the watch model input from the user terminal, Sd denotes a difference between the dimension information of the strap of the watch model input from the user terminal and the dimension information of the strap of the watch model of the same manufacturer and model line as the watch model input from the user terminal, Bd denotes a difference between the dimension information of the buckle of the watch model input from the user terminal and the dimension information of the buckle of the watch model of the same manufacturer and model line as the watch model input from the user terminal, and Pf denotes a numerical value that serves as a basis for providing a message suggesting the re-entry of the dimensions of each part of the watch or the watch delivery to the user terminal.

* * * * *